(12) United States Patent
Hoshino et al.

(10) Patent No.: US 12,550,039 B2
(45) Date of Patent: Feb. 10, 2026

(54) VEHICLE COMMUNICATION SYSTEM, RELAY SERVER, AND VEHICLE COMMUNICATION DEVICE

(71) Applicant: DENSO CORPORATION, Kariya (JP)

(72) Inventors: Masayuki Hoshino, Kariya (JP); Keisuke Ikushima, Kariya (JP)

(73) Assignee: DENSO CORPORATION, Kariya (JP)

( * ) Notice: Subject to any disclaimer, the term of this patent is extended or adjusted under 35 U.S.C. 154(b) by 337 days.

(21) Appl. No.: 18/474,508

(22) Filed: Sep. 26, 2023

(65) Prior Publication Data

US 2024/0022992 A1    Jan. 18, 2024

Related U.S. Application Data

(63) Continuation of application No. PCT/JP2022/012928, filed on Mar. 21, 2022.

(30) Foreign Application Priority Data

Mar. 30, 2021    (JP) .................................. 2021-057770

(51) Int. Cl.
*H04W 40/22*    (2009.01)
(52) U.S. Cl.
CPC .................................. *H04W 40/22* (2013.01)
(58) Field of Classification Search
CPC ......... H04W 40/22; H04W 4/90; H04W 4/44; H04W 88/04; H04W 92/18; H04W 4/46
USPC ....................................................... 455/445
See application file for complete search history.

(56) References Cited

U.S. PATENT DOCUMENTS

| | | | | |
|---|---|---|---|---|
| 9,741,253 | B2* | 8/2017 | Chandran | G08G 5/32 |
| 10,650,621 | B1* | 5/2020 | King | G07C 5/0816 |
| 10,708,734 | B2* | 7/2020 | Cavalcanti | H04W 4/023 |
| 11,546,180 | B2* | 1/2023 | Miyamoto | H04M 15/00 |
| 11,659,610 | B2* | 5/2023 | Tamura | H04W 36/0064 |
| | | | | 370/331 |
| 12,016,083 | B1* | 6/2024 | Sun | H04W 84/047 |
| 12,052,776 | B2* | 7/2024 | Zhang | H04W 76/11 |
| 12,219,626 | B2* | 2/2025 | Kim | H04W 76/22 |
| 2013/0294327 | A1* | 11/2013 | Horn | H04W 88/04 |
| | | | | 370/315 |
| 2016/0381620 | A1 | 12/2016 | Panaitopol et al. | |
| 2018/0124633 | A1* | 5/2018 | Hwang | H04W 76/00 |

(Continued)

FOREIGN PATENT DOCUMENTS

EP    2954726 A1    6/2019
JP    2006088829 A    4/2006

(Continued)

*Primary Examiner* — Mahendra R Patel
(74) *Attorney, Agent, or Firm* — Harness, Dickey & Pierce, P.L.C.

(57) ABSTRACT

Each of a first communication device and a second communication device is capable of performing vehicle-to-vehicle communication and cellular communication. The first communication device issues a proxy request to the second communication device for communication with an application server. When the second communication device receives proxy communication, the second communication device acquires an unused port number from the first communication device, notifies a relay server of the port number as the number of the port for proxy communication, and then performs the proxy communication.

11 Claims, 6 Drawing Sheets

(56) References Cited

U.S. PATENT DOCUMENTS

| | | |
|---|---|---|
| 2018/0167790 A1 | 6/2018 | Cavalcanti et al. |
| 2018/0227723 A1 | 8/2018 | Takahashi et al. |
| 2018/0295556 A1 | 10/2018 | Baek et al. |
| 2019/0173785 A1* | 6/2019 | Kameyama ............. H04L 45/74 |
| 2020/0053802 A1* | 2/2020 | Li ........................ H04W 12/06 |
| 2020/0314609 A1 | 10/2020 | Harada et al. |
| 2022/0078863 A1* | 3/2022 | Gupta ....................... G06F 9/54 |
| 2022/0086607 A1* | 3/2022 | Ali .......................... H04W 4/80 |
| 2022/0132524 A1* | 4/2022 | Mueck ............. H04W 72/1215 |
| 2022/0140967 A1* | 5/2022 | Khoryaev ........... H04W 56/002 |
| | | 375/220 |
| 2022/0322202 A1 | 10/2022 | Li et al. |

FOREIGN PATENT DOCUMENTS

| | | | | |
|---|---|---|---|---|
| JP | 2019168266 A | 10/2019 | | |
| JP | 2020162031 A | 10/2020 | | |
| WO | WO-2017022388 A1 | 2/2017 | | |
| WO | WO-2017052342 A1 * | 3/2017 | ............ | H04W 88/04 |
| WO | WO-2018/067956 A1 | 4/2018 | | |
| WO | WO-2019023122 A1 * | 1/2019 | ............ | H04W 60/04 |
| WO | WO-2021/045859 A1 | 3/2021 | | |

\* cited by examiner

| TCU-ID | PORT NUMBER | App-ID | TRAFFIC | PROXY DEVICE ID |
|---|---|---|---|---|
| 101 | 49152 | 11 | 3.0GB | – |
| 101 | 49154 | 11 | 1.2GB | 102 |
| 102 | 49156 | 12 | 5.0GB | – |
| ... | ... | ... | ... | ... |

FIG. 9

| TCU-ID | PORT NUMBER | App-ID | TRAFFIC | REQUEST SOURCE ID |
|---|---|---|---|---|
| 101 | 49152 | 11 | 3.0GB | -- |
| 102 | 49156 | 12 | 5.0GB | -- |
| 102 | 49158 | 11 | 1.2GB | 101 |
| ... | ... | ... | ... | ... |

VEHICLE COMMUNICATION SYSTEM, RELAY SERVER, AND VEHICLE COMMUNICATION DEVICE

CROSS REFERENCE TO RELATED APPLICATION

The present application is a continuation application of International Patent Application No. PCT/JP2022/012928 filed on Mar. 21, 2022, which designated the U.S. and claims the benefit of priority from Japanese Patent Application No. 2021-057770 filed on Mar. 30, 2021. The entire disclosures of all of the above applications are incorporated herein by reference.

TECHNICAL FIELD

The present disclosure relates to a technique for relaying data communication between a communication device used in a vehicle and a server.

BACKGROUND

Conventionally, vehicle-to-vehicle communication has been used for data communication between communication devices of vehicles.

SUMMARY

According to an aspect of the present disclosure, a plurality of communication devices are to be used in different vehicles. The communication devices are configured to perform cellular communication, which is wireless communication via a cellular base station, and vehicle-to-vehicle communication.

BRIEF DESCRIPTION OF THE DRAWINGS

The above and other objects, features and advantages of the present disclosure will become more apparent from the following detailed description made with reference to the accompanying drawings. In the drawings:

FIG. 9 is a diagram illustrating an example of the data amount management mode.

DETAILED DESCRIPTION

Figure 1:
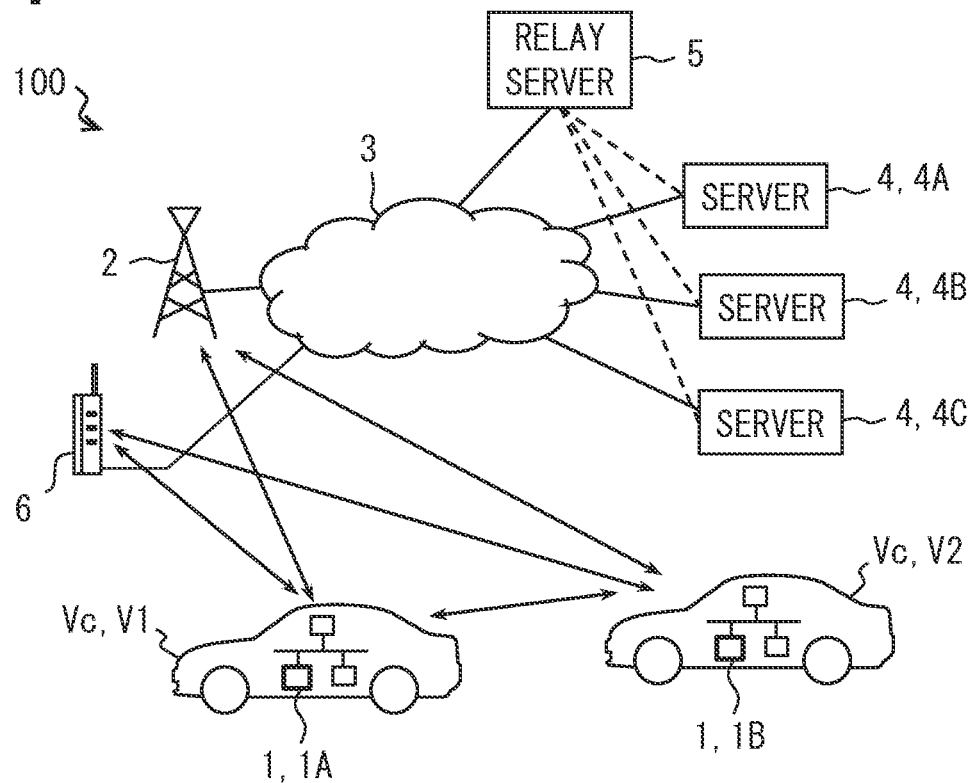
FIG. 1 is a diagram illustrating an overview of a vehicle communication system.

As follow, examples of the present disclosure will be described.

US2020/0314609A1, which corresponds to JP2020-162031A, discloses a configuration in which communication data acquired from another vehicle through vehicle-to-vehicle communication is uploaded to a predetermined server instead of the other vehicle based on a request from the other vehicle. For convenience, data communication of the other vehicle not performed by the other vehicle is referred to as proxy communication. In one aspect, the proxy communication can be understood as an act of relaying communication between the other vehicle and the server.

US2018/0227723A1, which corresponds to WO2017/022388, discloses a configuration in which an amount of packets in a packet data convergence protocol (PDCP) layer is observed to manage traffic for each piece of user equipment. Specifically, US2018/0227723A1 discloses a configuration in which the traffic is managed (measured) based on a sum of an amount of data of PDCP-service data units (SDUs) whose delivery to the user equipment is confirmed and a sum of an amount of data of the PDCP-SDUs received from the user equipment.

Contents of the description of US2020/0314609A1 and US2018/0227723A1 are incorporated by reference as a description of technical elements in the present disclosure.

In a vehicle communication system, there is a demand to manage how much data communication is performed by each vehicle as user equipment, in other words, traffic for each vehicle. On the other hand, for example, as in US2020/0314609A1, in a configuration in which a first vehicle, which is any vehicle, can take over data communication between a server and a second vehicle, which is another vehicle other than the first vehicle, the traffic of each vehicle may be unclear.

Specifically, traffic of the first vehicle increases by an amount corresponding to the proxy communication for the second vehicle. Traffic of the second vehicle may be reduced by an amount taken over by the first vehicle. That is, when the proxy communication is introduced, a substantial traffic for each vehicle is unclear.

According to an example of the present disclosure, a vehicle communication system comprises: a plurality of communication devices to be used in different vehicles and configured to perform cellular communication, which is wireless communication via a cellular base station, and vehicle-to-vehicle communication; and a relay server configured to relay data communication between the communication devices and an application server and manage data traffic for each of the communication devices. Each of the plurality of communication devices includes a proxy processing unit configured to relay data communication between the application server and an other device, which is an other one of the communication devices, as proxy communication, based on a request from the other communication device. The other device or a own device, which is a request source of the proxy communication, is configured to, when performing the proxy communication, perform the cellular communication using, as a port for the proxy communication, a port that is not used in normal communication, which is not the proxy communication, and notify the relay server of a number of the port for the proxy communication. The relay server is configured to manage an amount of data for the proxy communication separately from an amount of data communication that is not the proxy communication, based on a number of a port used for communication.

According to the above system configuration, ports used for communication are different between the proxy communication and normal communication. Therefore, the relay server can manage a substantial traffic for each communication device based on the port number. The normal communication refers to communication that is not proxy communication, that is, communication for the own device, not communication for another device.

According to an example of the present disclosure, a relay server is configured to relay data communication between communication devices, which are to be used in vehicles, and an application server and manage data traffic for each of the communication devices. The relay server is configured to acquire a number of a port for proxy communication from the communication device when the communication device takes over data communication between the application server and an other device, which is an other of the communication devices, and manage an amount of data of the proxy communication separately from an amount of data communication, which is not the proxy communication, based on the number of the port used for the data communication.

According to the relay server described above, since the ports used for communication are different between the proxy communication and the normal communication, it is possible to distinguish a normal traffic from traffic associated with the proxy communication based on the difference in the port number.

According to an example of the present disclosure, a vehicle communication device is configured to perform cellular communication, which is wireless communication via a cellular base station, and vehicle-to-vehicle communication, the vehicle communication device further configured to perform communication with an external device via a predetermined relay server. The predetermined relay server is configured to manage traffic of the vehicle communication device. The vehicle communication device comprises: a proxy processing unit configured to relay data communication between the external device and an other vehicle communication device, by using, as proxy communication, the vehicle-to-vehicle communication and the cellular communication in combination, based on a request from the other vehicle communication device. The proxy processing unit is configured to perform communication with the external device using a port for the proxy communication when performing the proxy communication, wherein the port for the proxy communication is not used in normal communication, which is not the proxy communication, by the other vehicle communication device or an own device, which is a request source of the proxy communication, and notify the relay server of a number of the port for the proxy communication.

The vehicle communication device uses different port numbers for the normal communication and the proxy communication, and notifies the relay server of the port number used for the proxy communication. According to this configuration, the relay server can distinguish the normal traffic from the traffic associated with the proxy communication based on the difference in the port number.

Hereinafter, an embodiment of the present disclosure will be described below with reference to the drawings. FIG. 1 is a diagram illustrating an example of a schematic configuration of a vehicle communication system 100 according to the present disclosure. The vehicle communication system 100 provides wireless communication in accordance with, for example, long term evolution (LTE). Portions not described in the embodiment are assumed to be implemented by a method defined in an LTE standard. The vehicle communication system 100 may provide wireless communication in accordance with a 3G standard, a 4G standard, a 5G standard, or the like. Hereinafter, LTE, 3G, 4G, 5G, and the like are collectively referred to as LTE or the like. The following embodiment can be appropriately modified and implemented in accordance with 3G, 4G, 5G, or the like defined by the third generation partnership project (3GPP).

<Overall Configuration>

As illustrated in FIG. 1, the vehicle communication system 100 includes in-vehicle communication devices 1, a cellular base station 2, a core network 3, application servers 4, and a relay server 5. The vehicle communication system 100 may include, as any element, a Wi-Fi base station 6 that provides a wireless local area network (LAN) in accordance with a Wi-Fi (registered trademark) standard. Although only one cellular base station 2 and one Wi-Fi base station 6 are illustrated in FIG. 1, there may be multiple cellular base stations 2 and Wi-Fi base stations 6.

A first vehicle V1 and a second vehicle V2 are vehicles in each of which the in-vehicle communication device 1 described below is installed. Although FIG. 1 illustrates only two vehicles Vc, that is, the first vehicle V1 and the second vehicle V2, in each of which the in-vehicle communication device 1 is installed, there may be three or more vehicles in the system as a whole. For the sake of convenience, the in-vehicle communication device 1 installed in the first vehicle V1 is also referred to as a first communication device 1A. The in-vehicle communication device 1 installed in the second vehicle V2 is also referred to as a second communication device 1B. The first communication device 1A and the second communication device 1B basically have the same configuration, but do not necessarily have completely the same specifications. The first communication device 1A and the second communication device 1B may have different software versions used, OS's, the number of antennas, contracted communication carriers, the number of available communication lines, communication fee plans, and the like.

As described below, the in-vehicle communication devices 1 perform data communication with the application servers 4 each corresponding to any application 81 used in the vehicle Vc. The application servers 4 correspond to an external device. The in-vehicle communication devices 1 correspond to a vehicle communication device. The "application" is an abbreviation of application.

Each in-vehicle communication device 1 is capable of performing cellular communication, vehicle-to-vehicle communication, and Wi-Fi communication, which are wireless communication using a cellular line. The cellular line here indicates a communication line via the cellular base station 2, in other words, a communication line in accordance with a standard such as the LTE or the like. The vehicle-to-vehicle communication refers to direct communication between vehicles. As a standard of the vehicle-to-vehicle communication, a dedicated short range communications (DSRC) standard corresponding to the IEEE 802.11p standard, a wireless access in vehicular environment (WAVE) standard disclosed in IEEE 1609 or the like, or the like can be adopted. The vehicle-to-vehicle communication may be in accordance with an STD-T75 standard of the association of radio industries and businesses (ARIB). The vehicle-to-vehicle communication may include a cellular V2X in accordance with a standard such as the LTE. The Wi-Fi communication refers to data communication via the Wi-Fi base station 6. The Wi-Fi communication can be performed when the vehicle Vc is present in a communication area of the Wi-Fi base station 6.

Multiple in-vehicle communication devices 1 may be capable of using multiple cellular lines having different access point names (APNs). The APN is an identifier of a communication service in one aspect. The APN is associated with a communication carrier (so-called carrier) that provides a communication service. For example, the first communication device is capable of using one APN, and the second communication device 1B is capable of using two APNs in parallel. The APN usable by the first communication device 1A may be the same as one of the two APNs usable by the second communication device 1B. When the APNs are different, even for the same application server 4 serving as a communication partner, paths through which data flows to the application server 4 are substantially or virtually different. The multiple cellular lines implement different communication paths.

The cellular base station 2 is a facility that transmits and receives radio signals in accordance with a standard such as the LTE to and from the in-vehicle communication device 1. The cellular base station 2 is also referred to as an evolved NodeB (eNB). The cellular base station 2 may be a next generation NodeB (gNB) used in 5G.

The cellular base station 2 is connected to the core network 3 via an access line such as an internet protocol (IP) network. The cellular base station 2 relays traffic between the in-vehicle communication device 1 and the core network 3. The cellular base station 2 performs, for example, assignment of transmission opportunities based on a request from the in-vehicle communication device 1. Each transmission opportunity includes a frequency band, a time, a modulation system, and the like that are available for data transmission.

The cellular base station 2 transmits various reference signals (RS) as needed. The reference signals include a cell-specific RS (CRS), a sounding RS (SRS), a CSI-reference signal (CSI-RS), a demodulation RS (DMRS), or the like. The CRS is a control signal for cell selection. The SRS, the CSI-RS, and the DMRS are RS's for estimating a state of a transmission line in an uplink direction or a downlink direction. Information indicating a communication state is also referred to as communication state information (CSI). The various RS's correspond to a control signal for the in-vehicle communication device 1 to evaluate a state of the communication line in one aspect. Here, the state of communication line refers to, for example, a communication speed, latency, a packet loss rate. The various RS's may be transmitted periodically or may be transmitted in response to an occurrence of a predetermined event. The transmission of the RS's may be triggered by, for example, receiving an inquiry from user equipment (UE) or when an occurrence frequency of a communication error exceeds a predetermined threshold.

The core network 3 is a so-called evolved packet core (EPC). The core network 3 provides functions such as user authentication, a contract analysis, setting of a data packet transfer path, quality of service (QoS) control, and the like. The core network 3 may include, for example, a public communication network provided by a communication carrier, such as an IP network or a cellular phone network. In the core network 3, the transfer path for data is different for each APN. Various facilities constituting the core network 3 are hereinafter also referred to as a network-side device. The cellular base station 2 described above can also be included in the network-side device.

Each application server 4 is a facility that provides a predetermined service (function) in cooperation with the application 81 used in the vehicle Vc. Each application server 4 illustrated in FIG. 1 corresponds to an application server that executes predetermined processing on data received from the application 81 used in the vehicle Vc. The application server 4 transmits data corresponding to the provided service to the application 81 and collects data from the application 81.

The relay server 5 is a server that relays communication between the vehicle Vc and the application server 4. The relay server 5 integrally performs communication connection control between the vehicle Vc and the application server 4 and monitoring of a communication state. The relay server 5 constitutes an automotive communication platform (ACP) in cooperation with the in-vehicle communication device 1. The ACP is a technique for enabling a secure communication connection between the application server 4 and the application 81 at any time. For example, depending on a difference in a model, a release year (generation), a grade, or the like for each vehicle Vc, a combination of an ECU in which a power supply is turned off during parking and an ECU in which the power supply is not turned off may be different. A configuration of an in-vehicle system including the ECUs may be different for each vehicle Vc. The relay server 5 plays a role of concealing, from the application server 4, a difference in power supply states between ECUs and a difference in system configurations between vehicles. As a result, a situation in which each ECU 8 and the application server 4 are constantly connected, that is, a pseudo-continuous connection between the ECU 8 and the application server 4 is realized. In this manner, since the relay server 5 is a server that constitutes the ACP in one aspect, the relay server 5 can also be referred to as an ACP server.

The relay server 5 can exchange information with the in-vehicle communication device 1 installed in the vehicle Vc by wireless communication via the core network 3. The relay server 5 is capable of performing communication with the in-vehicle communication device 1 not only by a cellular phone line but also by wireless communication such as Wi-Fi and V2X. The relay server 5 transmits data to the ECU 8 installed in a designated vehicle Vc or acquires data from the vehicle based on a request from the application server 4.

Figure 2:
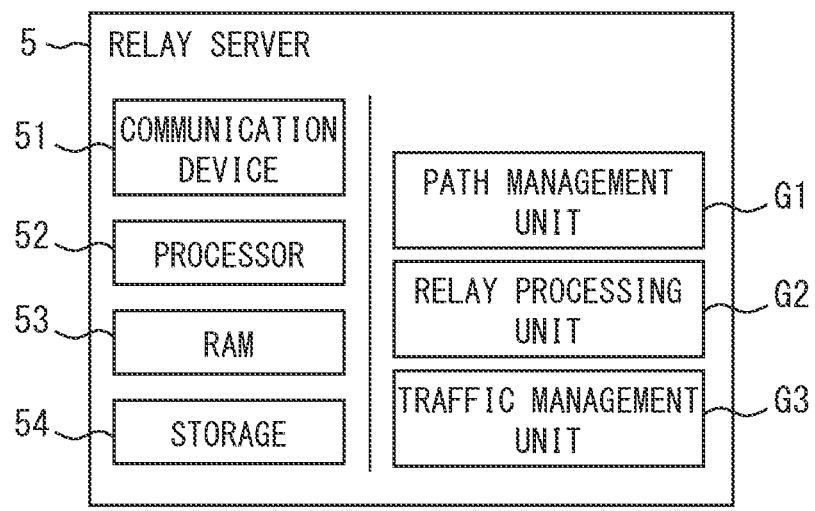
FIG. 2 is a block diagram illustrating a configuration of a relay server.

As illustrated in FIG. 2, the relay server 5 is implemented using a communication device 51, a processor 52, a random access memory (RAM) 53, and a storage 54. The communication device 51 is configured to perform communication with the in-vehicle communication device 1 or the various application servers 4. The processor 52 is, for example, a calculation core such as a central processing unit (CPU). The RAM 53 is a rewritable volatile memory. The storage 54 is a rewritable non-volatile memory. The storage 54 stores a relay server program, which is a program for relaying data communication between the in-vehicle communication device 1 and the application server 4. The relay server program may also be referred to as ACP cloud software.

The relay server 5 includes, for example, a path management unit G1, a relay processing unit G2, and traffic management unit G3 as functional modules that are implemented by the processor 52 executing the relay server program stored in the storage 54.

The path management unit G1 is configured to manage communication path information from the in-vehicle communication device 1 to the various application servers 4. Here, the communication path information includes, for example, a so-called 5-tuple, such as a source IP address, a source port number, a destination IP address, a destination port number, and a protocol number.

The in-vehicle communication device 1 assigns a unique number to each application 81 as the source port number. The port number can be expressed by, for example, a 16-bit numerical value. Each source port number is stored in association with an application identifier (application ID) which is identification information for each application 81. Multiple source ports may be assigned to one application 81.

The in-vehicle communication device 1 may be configured to dynamically set the source port number in a range from 49152 to 65535 which is dynamically usable, for example. The source port number may also be referred to as a transmission source port number.

The path management unit G1 acquires communication path setting information by exchanging control signals with the in-vehicle communication device 1 and the application server 4. The relay server 5 serving as the path management unit G1 notifies the application server 4 of information necessary for communication between the application 81 and the application server 4, such as the source port number assigned to the application 81. The path management unit G1 corresponds to a path information acquisition unit.

In addition, the path management unit G1 manages the source port number in association with an application ID, an ECU-ID, and a communication device ID. The application ID is identification information for identifying the application 81. The ECU-ID is identification information for identifying the ECU 8. The communication device ID is identification information for identifying the in-vehicle communication device 1 (vehicle Vc). Information on the application ID, the ECU-ID, and the communication device ID for each source port held by the relay server 5 is synchronized with the information held by the in-vehicle communication device 1 through communication with the in-vehicle communication device 1.

The relay processing unit G2 transfers data transmitted from the in-vehicle communication device 1 to the application server 4 determined in accordance with destination information described in a header or the like, based on the communication path information acquired by the path management unit G1. The relay processing unit G2 transfers the data transmitted from the application server 4 to the in-vehicle communication device 1.

The traffic management unit G3 is configured to manage the data traffic for each in-vehicle communication device 1. For example, the traffic management unit G3 manages traffic for each in-vehicle communication device 1 using IP addresses. Specifically, the traffic management unit G3 manages the traffic for each in-vehicle communication device 1 using a source IP address indicated in an IP header in uplink communication and a destination IP address in downlink communication. The IP header corresponds to a data field in which the source IP address and the destination IP address are inserted. Regarding the same in-vehicle communication device 1, traffic for each application 81 is managed using a correspondence relationship between the source port number and the application ID. Since one application 81 is associated with a source port, a total amount of data communication via a certain source port indicates a part or all of traffic of the application 81 associated with the source port. According to a configuration in which the traffic of the application 81 is managed separately for each communication line, traffic for each application 81 can be calculated separately as described later.

The traffic management unit G3 may be configured to manage traffic for each user equipment by observing an amount of packets in a packet data convergence protocol (PDCP) layer. That is, the traffic management unit G3 may manage the traffic by acquiring, from a network-side device related to the PDCP, an amount of data of PDCP-SDUs whose delivery to the user equipment is confirmed and an amount of data of the PDCP-SDUs received from the user equipment. SDU is an abbreviation of service data unit.

In addition, the relay server 5 may be configured to perform a process for authenticating the application server 4 and the vehicle Vc. Each application server 4 may have a part or all of functions provided by the relay server 5. The network-side device may have a part or all of functions provided by the relay server 5. In a viewpoint, the relay server 5 can be interpreted as a type of the network-side device. A functional arrangement can be appropriately changed.

The Wi-Fi base station 6 is a communication facility for forming a wireless LAN in accordance with Wi-Fi. As a Wi-Fi standard, various standards such as IEEE 802.11n, IEEE 802.11ac, and IEEE 802.11ax (so-called Wi-Fi 6) can be adopted. The Wi-Fi base station 6 is disposed as infrastructure equipment at any location by various service providers. The Wi-Fi according to the present disclosure refers to Wi-Fi available for the in-vehicle communication device 1, such as free Wi-Fi, or Wi-Fi of which a user or a vehicle manufacturer has a usage contract.

Example of Application Server 4

An application server 4A is, for example, the application server 4 that distributes dynamic traffic information or quasi-dynamic traffic information (hereinafter, referred to as control support information) serving as a reference of the control of the vehicle Vc. The control support information is, for example, information indicating a current position, a travel speed, a traveling direction, and the like of another moving object present in the periphery of the vehicle. The control support information may be, for example, information on a quasi-dynamic map element indicating a position and a type of an obstacle in traveling, such as a section in which traffic regulation is performed, a tail position of a traffic congestion, a position of an on-road dropped object, and the like. The control support information may be information indicating a position and a lighting state of a traffic light present in front of the vehicle Vc, and information indicating a traveling trajectory according to a traveling direction in an intersection. Such an application server 4A corresponds to the application server 4 corresponding to an advanced driver-assistance systems (ADAS) application.

The application server 4B is a server that generates and updates the map data based on probe data uploaded from the vehicle Vc. An application server 4B may be a server that distributes static map data stored in a predetermined database based on a request from the vehicle Vc. The map data distributed by the application server 4B may be high accuracy map data or navigation map data. The high accuracy map data corresponds to map data indicating a structure of a road, position coordinates of a feature disposed along the road, and the like with accuracy that can be used for autonomous driving. The navigation map data is map data for navigation, and corresponds to map data having relatively lower accuracy than the high accuracy map data. Such an application server 4B corresponds to the application server 4 corresponding to a map-based application that handles the map data. The map-based application can include a navigation application that performs path guidance using the map data.

An application server 4C is, for example, the application server 4 that transmits music data stored in a cloud to the vehicle Vc. Such an application server 4C corresponds to the application server 4 corresponding to a music application that reproduces music in the vehicle Vc.

Various servers/centers can be adopted as the application server 4. The vehicle communication system 100 may include, as the application server 4, a remote control server that remotely controls the vehicle Vc. The remote control server displays, on a predetermined display, vehicle information transmitted from the vehicle Vc, such as an on-board camera image, a vehicle speed, and a current position, and transmits, to the vehicle Vc, an operation signal input by an operator to an input device. Here, the operator refers to a person who has an authority to control the vehicle Vc by remote control from an outside of the vehicle.

Needless to say, contents and services of the application 81 described above are merely examples, and can be appropriately changed. In addition to the above-described functions, the various applications 81 such as a video application, an emergency notification application, a remote control application, a voice recognition application, a probe application, and a software update application may be installed in the vehicle Vc. The video application is the application 81 that streaming reproduces a video stored on the cloud. The emergency notification application is the application 81 that communicates with a predetermined center with an accident, an abnormality of the occupant, or the like as a trigger, and the remote control application is the application 81 that remotely controls the vehicle Vc. The voice recognition application is the application 81 that recognizes a voice content of the user acquired by an in-vehicle microphone, and the probe application is the application 81 that uploads, to the server, probe data such as a road shape recognized by an on-board camera or the like. The software update application is the application 81 that updates software of any ECU 8 based on data acquired from the application server 4.

Here, as an example, it is assumed that one ECU 8 corresponds to one application 81, but the present disclosure is not limited thereto. One ECU 8 may include multiple applications 81. Further, the multiple ECUs 8 may be configured to execute one application 81 in cooperation with one another.

<Configuration of In-Vehicle Communication Device 1>

Figure 3:
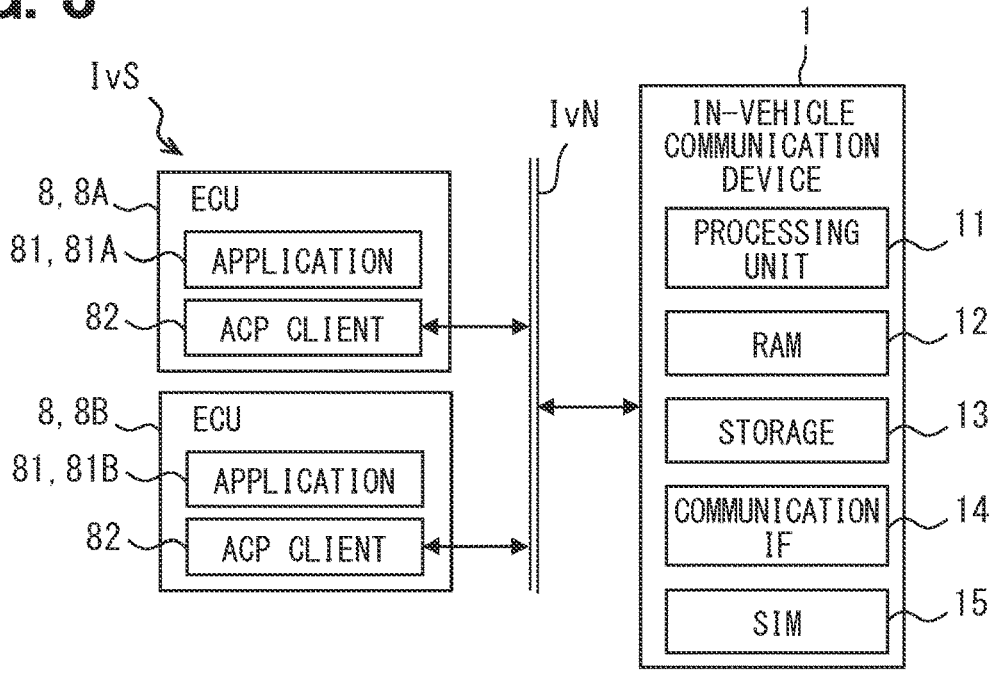
FIG. 3 is a block diagram illustrating a configuration of an in-vehicle communication device.

The in-vehicle communication device 1 is a device that provides the wireless communication function described above, and corresponds to a UE for the core network 3. The in-vehicle communication device 1 is used in connection with the ECU 8 installed in the vehicle as illustrated in FIG. 3. The vehicle Vc is a connected car that can be connected to the Internet by installing the in-vehicle communication device 1. The in-vehicle communication device 1 can also be referred to as a data communication module (DCM), a telematics control unit (TCU), or the like. A communication device ID as unique identification information is assigned to the in-vehicle communication device 1. The communication device ID may also be referred to as a DCM-ID or a TCU-ID. The in-vehicle communication device 1 is accommodated in, for example, an instrument panel. The in-vehicle communication device 1 may be removable by the user. The in-vehicle communication device 1 may be a mobile terminal such as a smartphone carried into a vehicle cabin by the user.

The in-vehicle communication device 1 includes at least one subscriber identity module (hereinafter, SIM) 15. Accordingly, the in-vehicle communication device 1 is capable of performing data communication using at least one APN corresponding to the SIM 15. The APN corresponding to the SIM 15 indicates an available APN based on information on the SIM 15. The SIM 15 may be capable of using multiple APNs or may be capable of using one APN.

In addition, the in-vehicle communication device 1 is capable of performing Wi-Fi communication, and selectively using the multiple cellular lines and Wi-Fi lines depending on an occurrence status of communication traffic in each ECU 8. That is, the in-vehicle communication device 1 selectively uses various communication lines based on communication purposes and a communication status. A concept of the communication line or the communication path available for the in-vehicle communication device 1 includes not only the cellular line but also the Wi-Fi line.

Although FIG. 3 illustrates only two ECUs 8 connected to the in-vehicle communication device 1, there may be three or more ECUs 8. The number of ECUs 8 directly or indirectly connected to the in-vehicle communication device 1 may be one. For example, the in-vehicle communication device 1 is capable of performing communication with each ECU 8 via an in-vehicle network IvN, which is a communication network built in the vehicle.

The in-vehicle communication device 1 may be capable of performing direct communication with each ECU 8 without passing through the in-vehicle network IvN. The in-vehicle communication device 1 may be capable of performing communication with another ECU via a central ECU, which is an ECU that controls the entire vehicle, or a gateway ECU that separates an inside and an outside of the vehicle from each other to secure security. As a standard of the in-vehicle network IvN, for example, various standards such as Controller Area Network (CAN is a registered trademark), Ethernet (registered trademark), and FlexRay (registered trademark) can be adopted. Details of the in-vehicle communication device 1 will be described later.

Each ECU 8 is implemented as a computer including a calculation core such as a CPU and a memory such as a RAM, and executes a program assigned to each ECU 8 to perform a process according to the program. Hereinafter, when the ECUs 8 connected to the in-vehicle communication device 1 are described separately, the ECUs 8 are also described as an ECU 8A and an ECU 8B. An ECU-ID is assigned to each ECU 8.

Each ECU 8 includes the application 81 and an ACP client 82. The application 81 is implemented by hardware such as a CPU executing predetermined application software. The "application" and "application" according to the present disclosure can be read as a device/calculation core that executes the application. The calculation core corresponds to a processor such as a CPU.

The application 81 corresponds to any one of the multiple application servers 4. For example, an application 81A included in the ECU 8A acquires, periodically or when a predetermined event occurs, from the application server 4A, real-time information (that is, control support information) serving as a reference for creating a control plan. The event that requests the control support information can be, for example, that a remaining time/distance to an intersection or a confluent branch point is less than a predetermined value. The application 81A may be configured to inquire the application server 4A of the control support information corresponding to the current position at predetermined time intervals. Such an application 81A corresponds to an example of an ADAS system application. The application 81A corresponds to an example of an application mainly used for the downlink communication.

The application 81B included in the ECU 8B is a probe application. The application 81B transmits the probe data to the application server 4B periodically or based on a request from the application server 4B. The application 81B corresponds to an example of an application mainly used for the uplink communication.

The application ID, which is identification information unique to each application 81, is assigned to each application 81. The application ID may be assigned by a designer of the application 81, or may be assigned by a predetermined ECU

8 that integrally manages installation of software to the vehicle Vc or the like at the time of installation to the vehicle Vc (actually, ECU 8). The application ID can be described as App-ID.

Each application 81 outputs, to the ACP client 82, transmission data addressed to the application server 4 corresponding to the application 81, and acquires data from the corresponding application server 4 via the in-vehicle communication device 1 and the ACP client 82. Each application 81 outputs a communication request to the ACP client 82 in accordance with generation of the transmission data to the application server 4 or the like. The communication request corresponds to, for example, a predetermined electric signal, a message, or a communication frame. The communication request includes the application ID.

The application 81 includes an encryption processing unit that encrypts transmission data and decrypts the data encrypted and transmitted from the application server 4. For example, the application 81 is capable of performing transport layer security (TLS) encrypted communication. Various methods can be adopted as an encrypted communication method. In a more preferable embodiment, the application 81 is capable of performing authentication of a communication partner, encryption of communication content, detection of falsification, and the like using an electronic certificate or the like. Not only the application 81 but also other devices such as the application server 4, the relay server 5, and the in-vehicle communication device 1 are capable of performing the TLS communication.

The ACP client 82 is configured to play a role of mediating communication between the application 81 and the in-vehicle communication device 1. The ACP client 82 can also be referred to as an in-vehicle relay module. The ACP client 82 may be disposed for each application 81 or each ECU 8. The ACP client 82 is also implemented by hardware such as a CPU executing ACP client software, which is predetermined software. The ACP client 82 transmits a communication start request from the application 81 to the in-vehicle communication device 1, and transmits, to the application 81, a response from the in-vehicle communication device 1 to the communication start request.

The ACP client 82 notifies the in-vehicle communication device 1 of the application ID and the ECU-ID periodically or when the predetermined event occurs. Accordingly, the in-vehicle communication device 1 can specify which application 81 is present in which ECU 8. The notification of the various IDs may be performed, for example, at a timing when a traveling power supply is turned on or at a predetermined time. The traveling power supply is, for example, an ignition power supply in an engine vehicle. In an electric vehicle, a system main relay corresponds to the traveling power supply.

In addition, the ACP client 82 switches an on-off state of a power supply of the ECU 8 based on an instruction signal from the in-vehicle communication device 1. The ACP client 82 can also control a start state of the application 81 based on a signal from the in-vehicle communication device 1. For example, when the ACP client 82 receives a push notification transmitted from the application server 4 via the in-vehicle communication device 1, the ACP client 82 turns on the power supply of the ECU 8 and activates the corresponding application 81.

The ACP client 82 may be any element and may be omitted. The function of the ACP client 82 may be included in the application 81 itself. The ACP client 82 may be configured as a part of the application 81. In addition, the ACP client 82 may be configured as a part of the in-vehicle communication device 1. The ACP client 82 may have an encrypted communication function of the application 81. A functional arrangement of each configuration can be appropriately changed.

Although FIG. 3 illustrates an example in which one ECU 8 includes one application 81, the ECU 8 may include multiple applications 81. When there are the multiple ECUs 8, the ACP client 82 of each ECU 8 can manage the application ID and the start state of each application 81.

The in-vehicle communication device 1 transmits data to the application server 4A corresponding to the application 81 according to a request from any application 81 installed in the vehicle Vc. Data transmitted from the application server 4 is received and transferred to the application 81. As described above, communication with the application server 4 is performed via the relay server 5 and a network device.

The in-vehicle communication device 1 mainly includes a computer including a processing unit 11, a RAM 12, a storage 13, a communication interface 14, the SIM 15, a bus that connects these units, and the like. The processing unit 11 is hardware for a calculation process combined with the RAM 12. The processing unit 11 includes at least one calculation core such as a CPU. The processing unit 11 performs various processes by accessing the RAM 12.

The storage 13 includes a non-volatile storage medium such as a flash memory. The storage 13 stores a communication control program as a program executed by the processing unit 11. The execution of the program by the processing unit 11 corresponds to performing a communication control method which is a method corresponding to the communication control program. Information (for example, profile or the like) on the APN available for the in-vehicle communication device 1 is registered in the storage 13.

The communication interface 14 is a circuit module for communicating with the ECU 8 via the in-vehicle network IvN. The communication interface 14 is implemented using an analog circuit element, an IC, a PHY chip in accordance with a communication standard of the in-vehicle network IvN, or the like.

The SIM 15 is an IC module in which information for identifying a contractor of a line is recorded, and is implemented as, for example, an IC card. For example, a unique number called international mobile subscriber identity (IMSI) is recorded in the SIM 15 in association with a telephone number of the contractor. Setting data related to wireless communication connection, such as an available frequency and a priority order of a frequency to be observed to determine a serving cell, is also registered in the SIM 15. The SIM 15 may be inserted into a card slot (not illustrated) or may be an embedded SIM (eSIM). A concept of the SIM 15 here includes both a detachable card type SIM and an embedded type SIM (that is, the eSIM). As described above, the in-vehicle communication device 1 may include multiple SIMs, and may be capable of using multiple cellular lines in parallel.

Figure 4:
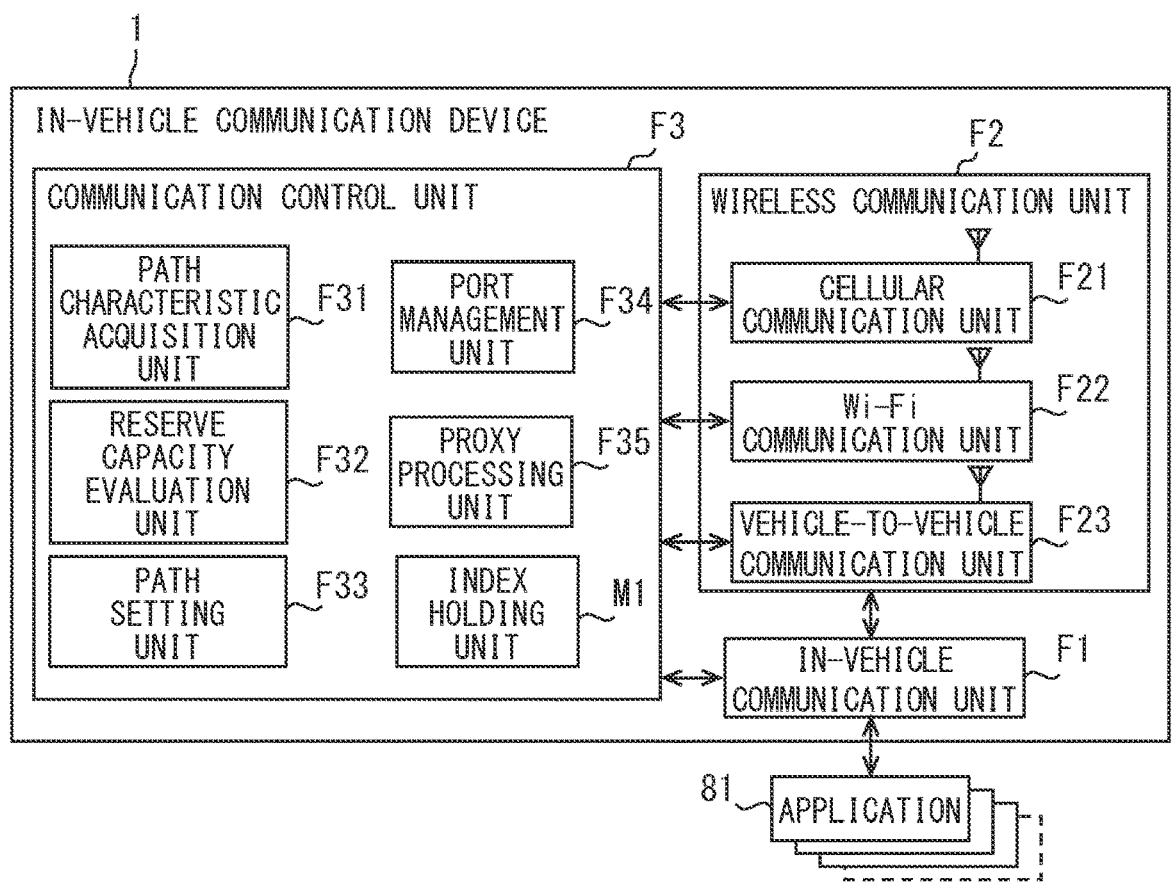
FIG. 4 is a block diagram illustrating functions of the in-vehicle communication device.

As illustrated in FIG. 4, the in-vehicle communication device 1 includes an in-vehicle communication unit F1, a wireless communication unit F2, and a communication control unit F3 as functional blocks. The wireless communication unit F2 includes a cellular communication unit F21, a Wi-Fi communication unit F22, and a vehicle-to-vehicle communication unit F23. The communication control unit F3 corresponds to a communication control device.

The in-vehicle communication unit F1 is configured to receive the transmission data output by each ECU 8, output the transmission data to the wireless communication unit F2, and output the data received by the wireless communication unit F2 to the ECU 8 to be transferred. For example, the in-vehicle communication unit F1 acquires original data by separating, by a predetermined method, data multiplexed and input from each ECU 8.

The in-vehicle communication unit F1 includes a buffer, which is a storage area for temporarily holding data input from each ECU 8 until the data is wirelessly transmitted. The buffer may be implemented using a rewritable storage medium such as a RAM. The in-vehicle communication unit F1 also has a function of monitoring an amount of data retained in the buffer and information stored in a header of the data. The buffer may be included in the communication control unit F3. The data stored in the buffer is sequentially taken out by the wireless communication unit F2, and is transmitted to the application server 4 serving as a destination via a communication path corresponding to an input source (that is, ECU 8) of the data. An assignment state of the communication path for each ECU 8 is controlled by the communication control unit F3.

The cellular communication unit F21 is, for example, a communication module in charge of a data link layer and a physical layer in a wireless communication protocol such as LTE. The cellular communication unit F21 includes an antenna capable of transmitting and receiving radio waves in a frequency band used in the LTE. The cellular communication unit F21 includes a transceiver that performs signal processing corresponding to conversion from a baseband signal to a high-frequency signal and inverse conversion thereof in accordance with the LTE communication standard, and a packet processing unit that performs conversion between an IP packet and a physical channel signal. Multiple antennas may be provided for reception diversity and the like.

The cellular communication unit F21 performs a process in each data link sublayer of PDCP, RLC, and MAC on the IP packet input from the in-vehicle communication unit F1. By performing a process such as encoding, modulation, digital-to-analog conversion, or the like, a carrier signal corresponding to the input data is generated. Then, the generated carrier signal is output to an antenna to radiate the carrier signal as radio waves. The MAC is an abbreviation of media access control. In addition, the cellular communication unit F21 performs a predetermined process such as an analog-to-digital conversion process and a demodulation process on the received signal received by the antenna, thereby converting the received signal into an information sequence (that is, digital data) expressed by digital values. Then, the data corresponding to the received signal is output to the in-vehicle communication unit F1.

The Wi-Fi communication unit F22 is a communication module for connecting to the Internet via the Wi-Fi base station 6 and communicating with the application server 4. The Wi-Fi communication unit F22 is implemented using, for example, an antenna that transmits and receives radio waves in a frequency band used in a Wi-Fi standard, such as a 2.4 GHz band or a 5 GHz band, a modulation circuit, and a demodulation circuit. The Wi-Fi communication unit F22 radiates a radio signal corresponding to data input from the in-vehicle communication unit F1 or the communication control unit F3. The Wi-Fi communication unit F22 outputs data corresponding to the received signal received by the antenna to the in-vehicle communication unit F1 or the communication control unit F3.

The Wi-Fi communication unit F22 recognizes the presence of the Wi-Fi base station 6 by receiving a beacon transmitted from the Wi-Fi base station 6. Communication connection between the Wi-Fi communication unit F22 and the Wi-Fi base station 6 is controlled by the communication control unit F3. The Wi-Fi communication unit F22 is not necessarily incorporated in the in-vehicle communication device 1. The Wi-Fi communication unit F22 may be provided outside the in-vehicle communication device 1 in such a manner that the in-vehicle communication device 1 can control an operation state of the Wi-Fi communication unit F22.

The vehicle-to-vehicle communication unit F23 is a communication module that performs direct wireless communication (that is, vehicle-to-vehicle communications) with the in-vehicle communication device 1 included in another vehicle using radio waves of a predetermined frequency band. The vehicle-to-vehicle communication unit F23 includes an antenna for transmitting and receiving radio waves of a frequency band for the vehicle-to-vehicle communication, a modulation circuit, a demodulation circuit, and the like. The vehicle-to-vehicle communication unit F23 modulates the data input from the communication control unit F3, outputs the modulated data to a vehicle-to-vehicle communication antenna, and wirelessly transmits the modulated data. The vehicle-to-vehicle communication unit F23 demodulates a signal received by the antenna and provides the demodulated signal to the communication control unit F3.

In the present embodiment, as an example, it is assumed that the vehicle-to-vehicle communication is performed by a communication system different from a communication system with the cellular base station 2, such as DSRC (WAVE), but the present disclosure is not limited thereto. The vehicle-to-vehicle communication may also be performed in accordance with a standard such as the LTE. Accordingly, the vehicle-to-vehicle communication unit F23 may be integrated with the cellular communication unit F21. Further, the vehicle-to-vehicle communication may be performed in accordance with a standard such as Wi-Fi. Accordingly, the vehicle-to-vehicle communication unit F23 may be integrated with the Wi-Fi communication unit F22. The vehicle-to-vehicle communication in the present disclosure refers to direct communication between the in-vehicle communication devices 1, and any communication system may be adopted.

The communication control unit F3 monitors and controls a communication state of each cellular line. In response to an occurrence of a predetermined connection event, the communication control unit F3 performs a procedure for establishing a cellular line. When multiple APNs are available, a line for each APN is established. The procedure for establishing the communication line includes transmission of an attach request, transmission of APN information, and the like. For example, the core network 3 prepares a radio bearer and a PDN connection in accordance with contract contents based on information such as an APN notified by the in-vehicle communication device 1. Examples of the connection event include a case where restart of the in-vehicle communication device 1 due to software update or a failure is performed, and a case where a cellular communication function, that is, mobile network connection is enabled by a user or a staff member of a maintenance factory.

The communication control unit F3 controls an operation of the Wi-Fi communication unit F22. The communication control unit F3 starts the communication connection between the Wi-Fi communication unit F22 and the Wi-Fi base station 6 based on reception of a beacon by the Wi-Fi communication unit F22. That is, the Wi-Fi communication unit F22 exchanges control signals with the Wi-Fi base station 6 for IP address acquisition and security settings (exchange of an encryption key or the like). The communication control unit F3 also controls an operation of the vehicle-to-vehicle communication unit F23.

Further, the communication control unit F3 includes, as function units, a path characteristic acquisition unit F31, a reserve capacity evaluation unit F32, a path setting unit F33, a port management unit F34, and a proxy processing unit F35. The communication control unit F3 further includes, for example, an index holding unit M1 implemented using a rewritable storage medium such as the RAM 12.

The path characteristic acquisition unit F31 is configured to acquire various kinds of information indicating communication characteristics for each communication line. For example, the path characteristic acquisition unit F31 acquires, from the network-side device, parameters related to a communication speed for each cellular line. Examples of the communication setting parameters for each cellular line include an assignment frequency, a priority order for packet transfer, a target delay time, and a packet loss rate. The target delay time is a maximum value of a communication delay time assumed by the network-side device. The target delay time corresponds to a delay threshold set by the network-side device. The communication setting parameters acquired by the path characteristic acquisition unit F31 are stored, for example, in the index holding unit M1.

The path characteristic acquisition unit F31 may sequentially evaluate a round-trip time (RTT) and throughput for each cellular line as state information for each cellular line, and store evaluation results in the index holding unit M1. The RTT is a time taken from when a signal or data is transmitted to a communication partner to when a response is returned, that is, a response delay time. The RTT is also referred to as round-trip latency. The throughput represents an amount of data that can be transmitted and received per unit time through a transmission line. The throughput corresponds to an index indicating the communication speed. The throughput may be separately evaluated for the uplink communication and the downlink communication. Regarding the RTT, latency, and the like, a state of each cellular line may be evaluated using an average value of observation values within a latest predetermined time.

In addition, the path characteristic acquisition unit F31 may acquire information indicating a load status, a congestion degree, and a reserve capacity of the cellular base station 2 corresponding to a contract line. The path characteristic acquisition unit F31 may calculate a power headroom (hereinafter, PHR), which is a reserve capacity of transmission electric power, for each cellular line. The PHR is a parameter indicating a difference between a set value of a current transmission electric power and a maximum transmission electric power in a physical uplink shared channel (hereinafter, PUSCH). The path characteristic acquisition unit F31 may calculate RSRP, RSSI, RSRQ, and the like. The RSRP is an abbreviation of reference signal received power. The RSSI is an abbreviation of received signal strength indicator. The RSRQ is an abbreviation of reference signal received quality. The RSRP is an average received electric power of the RS per unit resource element. The RSSI is a value obtained by measuring an overall electric power of an LTE system bandwidth in an OFDM symbol that stores the RS. The RSRQ is a ratio of a received electric power of a cell-specific reference signal to a total electric power within a received bandwidth. The greater the RSRQ, the better a reception quality of a signal from the cellular base station 2. The PHR, the RSRP, the RSSI, and the RSRQ may be calculated by a method defined by the 3GPP.

The reserve capacity evaluation unit F32 evaluates a reserve capacity of the cellular line available for a subject device (own device) based on various indexes directly or indirectly indicating the communication speed and availability of a communication bandwidth acquired by the path characteristic acquisition unit F31. A larger reserve capacity indicates that a larger amount of data can be stored. The reserve capacity evaluation unit F32 can calculate a reserve capacity for each cellular line available for the subject device by combining multiple indexes. The reserve capacity evaluation unit F32 evaluates the reserve capacity to be larger as the communication speed is higher, the delay time is shorter, and the PHR is larger. The reserve capacity may be expressed as a score or may be expressed by multiple ranks. For example, the reserve capacity may be determined in two stages, that is, presence/absence, or may be expressed in three stages, that is, absence/small/medium. A state with no reserve capacity corresponds to a state where proxy communication is disabled, which will be described later, and a state with small reserve capacity corresponds to a state where only proxy communication of relatively small data having a data size equal to or smaller than a predetermined value can be performed. The reserve capacity may be determined using only one predetermined item such as the PHR. An evaluation result of the reserve capacity evaluation unit F32 is referred to by, for example, the path setting unit F33, the proxy processing unit F35, and the like. The reserve capacity evaluation unit F32 is any element.

The path setting unit F33 is configured to set a communication path to be used for data communication of each application 81 based on characteristics of each cellular line. For example, a communication line with low latency is assigned to the application 81 that requires real-time performance, such as an ADAS application. A communication line having a large communication speed or a large reserve capacity is preferentially assigned to the application 81 such as a map application that is expected to have a relatively large data size. In an environment in which Wi-Fi communication can be used, Wi-Fi communication is preferentially assigned as a communication path to the application 81 that does not require the real-time performance. Elements constituting the communication path can include, in addition to a type of communication line, a size (width) of assigned communication bandwidth, an assignment frequency, a type of communication protocol, and the like. The communication protocol includes a transmission control protocol (TCP), a user datagram protocol (UDP), and the like.

Upon receiving a communication start request from the application 81 or the application server 4, the path setting unit F33 secures a source port for the application, performs a routing process, and sets a communication path from the application 81 to the application server 4. Accordingly, the source IP address, the source port number, the destination IP address, the destination port number, the protocol, and the like are determined. The source port is assigned to each application 81. That is, one source port is set not to be shared by the multiple applications 81. Multiple source port numbers may be assigned to one application.

When the setting of the communication path to the application server 4 is completed, the in-vehicle communication device 1 as the path setting unit F33 returns a communication permission response, which is a message indicating that communication is permitted, as a response to the communication start request to the ACP client 82. The communication permission response includes at least a source port number. The communication permission response of the in-vehicle communication device 1 may include the source IP address, the destination IP address, the destination port number, and the protocol.

In addition to the source port number, the communication control unit F3 controls an execution right of communication of each application 81 using a token. The token corresponds to a control signal indicating whether communication is allowed now. While the token is input from the in-vehicle communication device 1, each application 81 can perform communication with the application server 4 using the notified source port. The presence or absence of the token may be dynamically switched while maintaining the source port. The application 81 may have a configuration of determining that, once the token is input, a communication right is held until a signal for removing the token is input. The communication control unit F3 may dynamically control the presence or absence of the token of each application 81 in view of the usage state of the line and a communication demand of another application 81.

The port management unit F34 manages the source port number assigned to each application 81. The port management unit F34 manages which ECU 8 has the application 81 based on a notification from each ACP client 82. The port management unit F34 stores the application ID of each application 81 and the ECU-ID of each ECU 8 in the RAM 12 in association with the source port number. The port management unit F34 notifies the relay server 5 of the application ID and the ECU-ID for each source port number together with the communication device ID associated with the in-vehicle communication device 1. Through such a process, ID information held by the relay server 5 and the in-vehicle communication device 1 is synchronized.

In accordance with a communication environment of the subject device, the proxy processing unit F35 requests another in-vehicle communication device 1 present in the vicinity of the subject device to take over communication (hereinafter, proxy communication) with the application server 4 instead of the subject device. Here, the proxy communication refers to relaying communication between the application 81 of the other vehicle and the application server 4. A concept of the proxy communication includes a proxy of uplink communication in which data acquired from the other vehicle via the vehicle-to-vehicle communication is transmitted to the specified application server 4 via the cellular communication, and a proxy of downlink communication in which data downloaded from the application server 4 via the cellular communication is transferred to a request source via the vehicle-to-vehicle communication. In many cases, the expression "proxy" can be referred to as "transfer" or "relay". The request for the proxy communication corresponds to a request to relay communication between the application 81 of a subject vehicle and the application server 4 to the other vehicle. Communication between vehicles, in other words, communication between the in-vehicle communication devices 1, is performed by the vehicle-to-vehicle communication. Communication between each in-vehicle communication device 1 and the application server 4 is performed by a Wi-Fi line or cellular communication. As described above, the relay server 5 performs data communication between the in-vehicle communication device 1 and the application server 4.

As a preparation process for performing the proxy communication, the proxy processing unit F35 periodically shares a communication state of each communication line available for another device (another device) and the subject device by the vehicle-to-vehicle communication. The communication state of each communication line is not limited to a communication state of each cellular line, and can include a communication state of Wi-Fi. The communication state includes, for example, the communication speed to the relay server 5. The proxy processing unit F35 may share, as information indicating the communication state, a congestion degree of a line for each usable line, a communication capacity capable of performing proxy communication, and the like with the other device. The information indicating the communication state can include a reserve capacity for each cellular line calculated by the reserve capacity evaluation unit F32.

The proxy processing unit F35 compares the communication state in the subject device with the communication state in the other device, and determines whether to request the other device to perform proxy communication. For example, when it can be expected that the communication time in a case where communication is relayed by the other device is shorter than that in a case where the subject device performs data communication with the relay server 5 (accordingly, the application server 4), the proxy processing unit F35 requests the other device to perform proxy communication. More specifically, when an uplink communication speed in the other device is greater than an uplink communication speed in the subject device by a predetermined proxy utilization threshold or more, the proxy processing unit F35 requests the other device to perform proxy communication. The proxy utilization threshold used here is, for example, a parameter corresponding to a delay time caused by the vehicle-to-vehicle communication. The proxy utilization threshold may be a constant value set in advance or may be dynamically changed according to an observation value of a latency in the vehicle-to-vehicle communication. The proxy processing unit F35 requests the other device to perform proxy communication when it can be expected that the communication time can be comprehensively shortened through the relay by the vehicle-to-vehicle communication.

In response to receiving a request for the proxy communication from the other device, the proxy processing unit F35 secures a communication path for the proxy communication based on the request, and transfers, to the relay server 5, data transmitted from the request source via the vehicle-to-vehicle communication. Securing the communication path includes notifying the relay server 5 of a source port number for the proxy communication, a communication device ID of a request source for the proxy communication, and the like. An operation of the in-vehicle communication device 1 and the like related to the proxy communication will be described later in detail.

<Entire Process Flow>

Figure 5:
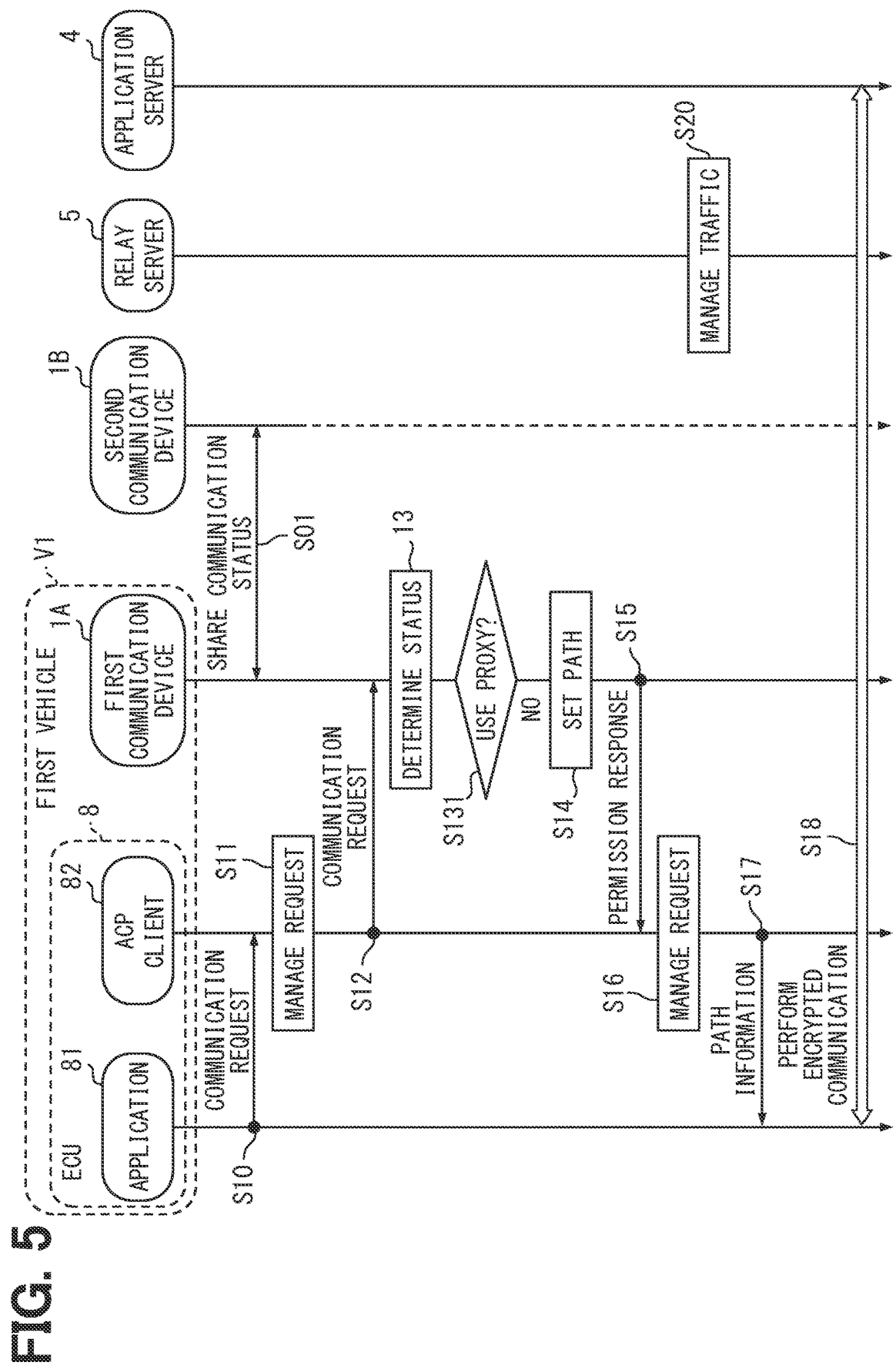
FIG. 5 is a sequence diagram illustrating a communication procedure when proxy communication is not used.
Figure 6:
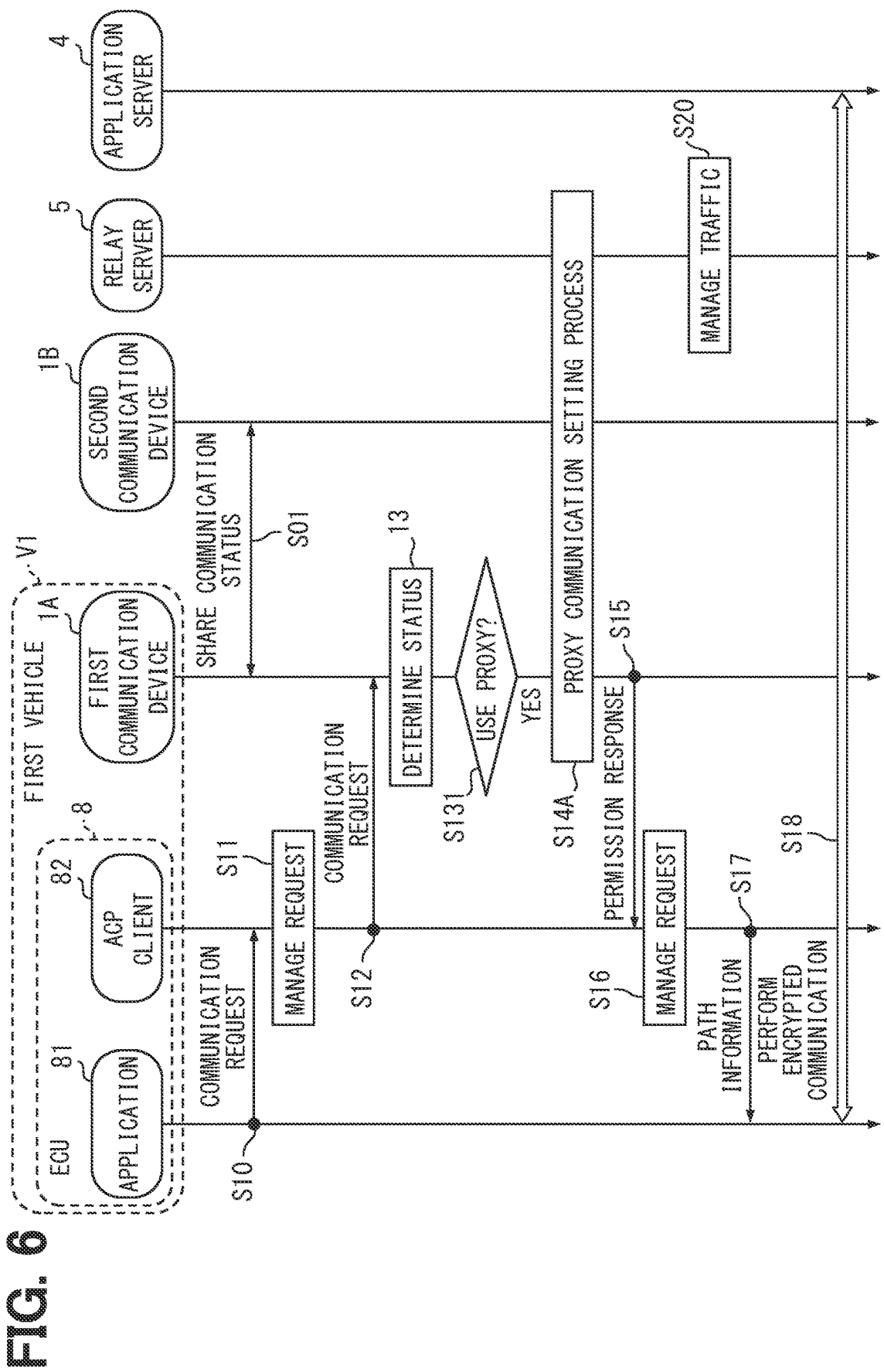
FIG. 6 is a sequence diagram illustrating a communication procedure when the proxy communication is used.

Next, a process flow for starting data communication with the application server 4 by any application 81 included in the first communication device 1A will be described with reference to sequence diagrams illustrated in FIGS. 5 and 6. FIG. 5 is a sequence diagram when the first communication device 1A performs data communication using a cellular line of the subject device or Wi-Fi communication without using proxy communication. FIG. 6 is a sequence diagram when the first communication device 1A performs data communication with the application server 4 using a proxy communication function of the second communication device 1B.

The ECU 8 illustrated in FIGS. 5 and 6 can be any ECU 8 included in the first vehicle V1. The application server 4 illustrated in FIGS. 5 and 6 is the application server 4 corresponding to the application 81 included in the ECU 8 illustrated in FIGS. 5 and 6. Hereinafter, for the sake of convenience, the application 81 which is an output source of the communication request is also referred to as a target application.

As a premise of the following description, each in-vehicle communication device 1 establishes a communication connection with the relay server 5 using a cellular line. The relay server 5 and the application server 4 are also in a mutually communicable state, and perform communication for communication confirmation and data communication as needed. The first communication device 1A and the second communication device 1B maintain a positional relationship in which the vehicle-to-vehicle communication is possible. The first communication device 1A and the second communication device 1B share a communication state with the relay server 5 with each other via the vehicle-to-vehicle communication as needed (S01).

First, when transmission data to the application server 4 is generated in the target application 81 included in the first communication device 1A, the application 81 outputs a communication request to the ACP client 82 corresponding to the application 81 (step S10). The ACP client 82 corresponding to a certain application 81 refers to the ACP client 82 included in the ECU 8, that is, the same ECU 8, that stores the application 81.

The communication request output from the application 81 to the ACP client 82 includes the application ID. The communication request may include a communication condition. As items constituting the communication condition, for example, an allowable waiting time, an allowable RTT, an assumed data size, a data loss possibility can be adopted. The allowable waiting time indicates an allowable waiting time until the communication starts. The allowable RTT indicates an allowable response delay time. The assumed data size indicates an assumed value of a size of one data set exchanged between the application 81 and the application server 4. The assumed data size indicates a necessary communication capacity. The data loss possibility indicates whether partial loss of data is allowed, in other words, whether the reliability of communication line is emphasized. The communication condition may be fixed for each application 81 or may be variable according to an amount and content of the transmission data.

Upon receiving the communication request from the application 81, the ACP client 82 receives the request (step S11). Specifically, the application ID and the communication condition are associated with each other and temporarily stored in a predetermined storage area. Data indicating a reception state of the communication request is stored in, for example, the RAM included in the ECU 8. The communication condition may be acquired by the ACP client 82 communicating with the application 81 in advance, or may be received as the communication request as described above. When a reception process of the communication request is completed, the ACP client 82 transmits a communication start request including the application ID and the communication condition to the first communication device 1A (step S12).

Based on the input of the communication start request from the ACP client 82, the first communication device 1A determines whether the communication path that satisfies the communication condition notified by the ACP client 82 can be assigned, based on a state of each communication line (step S13). At this time, the communication control unit F3 of the first communication device 1A considers the use of the proxy communication based on not only communication lines available for the subject device but also a communication state of the second communication device 1B acquired via the vehicle-to-vehicle communication. That is, the proxy processing unit F35 compares the communication state in the subject device with the communication state in another device, and determines whether to request the other device to perform proxy communication. Here, the subject device for the proxy processing unit F35 indicates the first communication device 1A, and the other device indicates the second communication device 1B. When there are multiple other devices in the vicinity of the subject device, the use of the proxy communication for each of the other devices is examined.

For example, the proxy processing unit F35 determines to adopt the proxy communication when communication satisfying the communication condition requested by the application 81 cannot be performed in the subject device but the communication condition requested by the application 81 can be satisfied in the other device. The proxy processing unit F35 also determines to use the proxy communication in a case where an overall communication efficiency is higher when the proxy communication is used than that when the subject device performs communication with the application server 4.

The case where the overall communication efficiency is higher when the proxy communication is used includes a case where a PHR in a serving cell of the subject device is equal to or less than a predetermined value, more specifically, a case where the maximum transmission electric power is reached, and a case where a PHR of the other device is equal to or more than the predetermined value, in addition to the above example. Similarly, a case where a packet error occurs in the communication with the cellular base station 2 and retransmission frequently occurs can also be included in the case where the overall communication efficiency is higher when the proxy communication is used. A proxy request condition, which is a condition for using the proxy communication, may be set as appropriate.

In a case where the proxy communication cannot be used, or in a case where the communication efficiency is higher when the subject device performs communication with the application server 4 without using the proxy communication, it is determined that the proxy communication is not to be used. The case where the proxy communication cannot be used is, for example, a case where there is no other device capable of performing vehicle-to-vehicle communication.

When it is determined that the proxy communication is not to be used (NO in S131), a line to be used for the communication between the application 81 and the application server 4 is selected from the communication lines available for the subject device. If there are multiple usable lines, a line most suitable for the communication condition of the application 81 is selected based on a usage state, quality, and the like of each communication line. If there is only one available communication line, the line is selected.

A communication path setting process using the selected communication line is performed (step S14). That is, the path setting unit F33 secures a source port for a target application, performs a routing process, and sets a communication path from the application 81 to the application server 4. Accordingly, the source IP address and the like are determined. The routing process includes acquisition of a destination IP address using a domain name system (DNS), establishment of a connection, generation of a routing table, and the like. The routing process itself is performed according to a predetermined signaling procedure.

The path setting in step S14 includes that the first communication device 1A notifies the relay server 5 of an application ID of the target application and a communication device ID in association with a source port number. The first communication device 1A may notify the relay server 5 of communication path information other than the source port number. The communication path information other than the source port number includes, for example, source and destination IP addresses, and a destination port number, or the like. A part or all of a line type, a communication carrier, an APN, and the like used for wireless communication can be included in the path information.

When the setting of the communication path to the application server 4 is completed, the first communication device 1A returns a communication permission response, which is a message indicating that communication is permitted, as a response to the communication start request to the ACP client 82 (step S15). The communication permission response includes, for example, path information such as a source port number and a destination IP address. As the response to the communication start request, the first communication device 1A may transmit a token indicating the presence or absence of an execution right of communication, in addition to the path information.

Upon receiving the communication permission response from the first communication device 1A, the ACP client 82 stores the application ID assigned to the target application, the path information, and the presence or absence of the token in association with one another as a request management process (step S16). Then, the ACP client 82 notifies the application 81 of the source port number and the presence or absence of the token as a response report from the first communication device 1A to the communication start request (step S17). The ACP client 82 may notify the application 81 of the path information other than the source port number, such as the destination IP address, from the first communication device 1A.

Upon receiving a report indicating that the communication path has been secured from the ACP client 82 in step S16, the application 81 starts encrypted communication with the application server 4 using the source port number indicated in the report (step S18). For example, the application 81 and the application server 4 perform TLS encrypted communication. In this case, the encrypted data generated by the application 81 is wirelessly transmitted from the first communication device 1A, relayed by the network-side device including the cellular base station 2, and the relay server 5, and reaches the application server 4. Needless to say, the downlink communication can also be performed in the same manner as the uplink communication. That is, data to be transferred is received from the application server 4 via cellular communication using a port for proxy communication, and the reception data is transferred to the other device as a request source via vehicle-to-vehicle communication.

In step S13, the communication control unit F3 may verify whether a communication line satisfying the communication condition notified by the ACP client 82 is present among the communication lines available for the subject device, based on the usage state, the quality, and the like of each communication line. That is, the communication control unit F3 may determine whether the communication path that satisfies the communication condition notified by the ACP client 82 can be assigned, based on the usage state, the quality, and the like of each communication line. A concept of the communication lines available for the subject device may include proxy communication in addition to a cellular line and Wi-Fi available for the subject device.

In step S13, when no communication line satisfying the communication condition notified by the ACP client 82 is present, the communication control unit F3 may return an assignment impossible response to the ACP client 82. The assignment impossible response is a message indicating that assignment is not possible. The assignment impossible response may be a message simply indicating that no communication line satisfying the requested communication condition is present. The assignment impossible response may include a predicted value of a waiting time until the communication that satisfies the communication condition is possible. In addition, the assignment impossible response may include a communication condition that can be performed in the current status. For example, an RTT of a communication service that can be provided at the present time, a transmittable data size, or the like may be notified.

As described above, communication between the application 81 and the application server 4 is performed via the relay server 5. The relay server 5 manages the traffic for each application 81 using the source port number notified by the first communication device 1A (step S20). That is, the relay server 5 measures the amount of data exchanged using the source port. The amount of data is managed separately for each line used for communication, as will be separately described later.

The above is an operation of a pattern in which the proxy communication is not used. When it is determined in step S13 that the proxy communication is to be used (YES in S131), a proxy communication setting process is performed as step S14A as illustrated in FIG. 6.

Figures 7, 8:
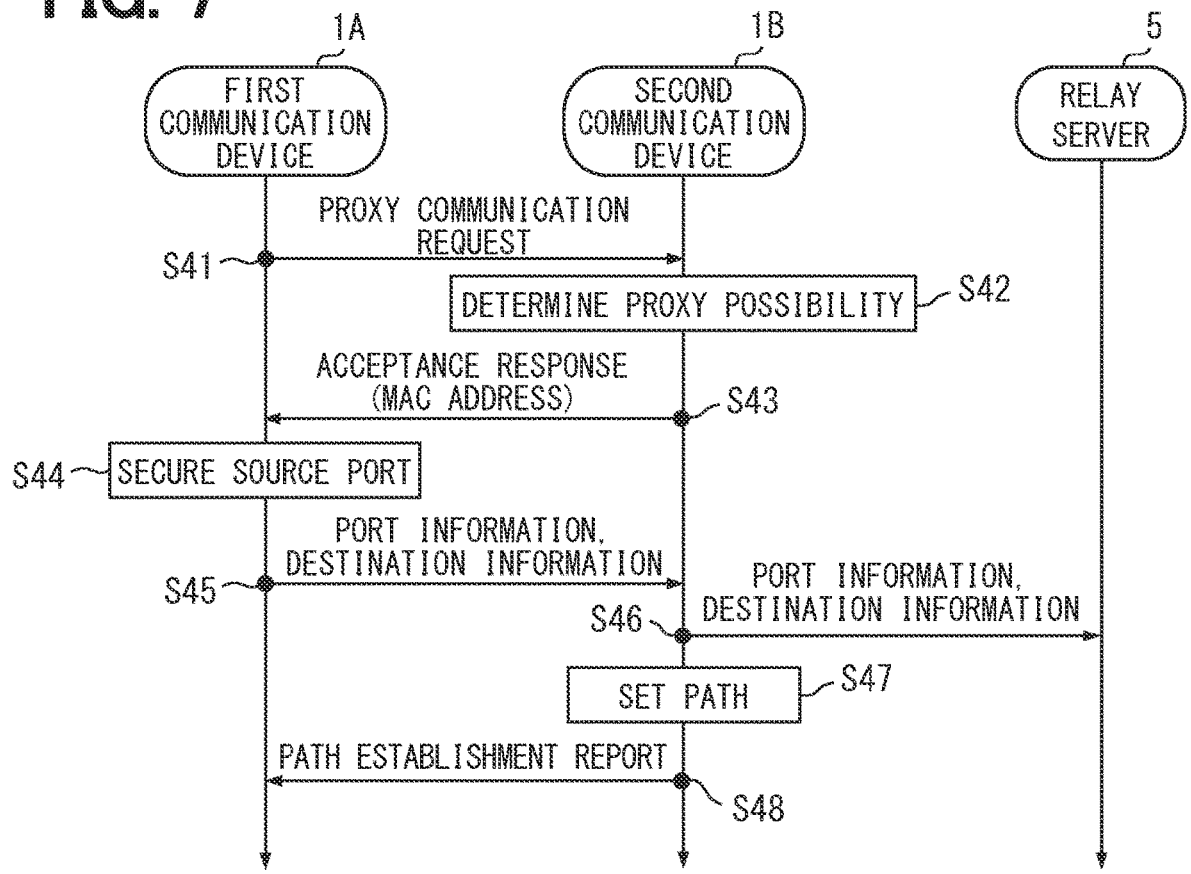
FIG. 7 is a sequence diagram illustrating a procedure for initiating the proxy communication.
FIG. 8 is a diagram illustrating an example of a data amount management mode.

The proxy communication setting process will be described with reference to FIG. 7. The flowchart illustrated in FIG. 7 is executed as step S14A. Here, as an example, the proxy communication setting process includes steps S41 to S48. Needless to say, the number of steps included in the proxy communication setting process and a processing order can be changed as appropriate. In the present disclosure, the in-vehicle communication device 1 that requests the proxy communication is also referred to as a request source communication device, and the in-vehicle communication device 1 that accepts the proxy communication and performs the proxy communication is also referred to as a proxy communication device. The proxy communication device can also be called a temporary repeater or a transfer device. In the following example, the first communication device 1A corresponds to the request source communication device, and the second communication device 1B corresponds to the proxy communication device.

In the proxy communication setting process, first, the first communication device 1A transmits, to the second communication device 1B, a proxy communication request signal that is a signal requesting the execution of the proxy communication via the vehicle-to-vehicle communication (step S41). The proxy communication request signal may include information including an L2 header (MAC header), such as a source MAC address. The MAC header corresponds to a data field indicating the source MAC address or a destination MAC address. Here, the transmission source refers to the first communication device 1A.

In the case of the request for the proxy communication related to the uplink communication, the first communication device 1A as the request source communication device may notify the second communication device 1B, as a request destination, of a proxy transmission amount that is an amount of data to be transmitted in the proxy communication. The proxy transmission amount may be included in the proxy communication request signal. The proxy communication request signal may include information indicating whether a type of the communication for which the proxy is requested is mainly the uplink communication or the downlink communication. The request source communication device may be configured to transmit a proxy communication request signal including a communication direction flag indicating whether proxy of the uplink communication or proxy of the downlink communication is requested.

When the second communication device 1B receives the proxy communication request, the proxy processing unit F35 determines whether to accept the proxy communication based on a communication status of the subject device (step S42). The subject device in this step refers to the second communication device 1B. The proxy processing unit F35 permits proxy communication, for example, in a case where there is a margin in a communication speed with respect to a communication demand (traffic amount) in the subject device, or in a case where the RTT is reduced to a predetermined value or less. The case where there is a margin in the communication speed includes, for example, a case where the communication speed is a predetermined value or more.

When the proxy transmission amount is notified by the first communication device 1A as the request source, the proxy processing unit F35 may determine whether the notified proxy transmission amount can be transmitted within a predetermined time based on the communication state of the own device, and may determine whether to accept the proxy communication based on the determination result. In this case, in response to determining that the amount of data notified by the request source cannot be transmitted within the predetermined time, the proxy processing unit F35 determines not to accept the proxy communication.

A proxy acceptance condition, which is a condition for accepting the proxy communication request from another device, may be appropriately designed. The proxy processing unit F35 may accept the proxy communication when a reserve capacity of a communication line calculated by the reserve capacity evaluation unit F32 is a predetermined value or more. The proxy processing unit F35 may accept the proxy of the uplink communication when there is a surplus in the transmission electric power, specifically, when a PHR value of the cellular line of the subject device is equal to or greater than a predetermined value. The proxy processing unit F35 may accept the proxy of the downlink communication when reception quality of the cellular line available for the subject device is good, specifically, when the RSRQ is equal to or greater than a predetermined value. The proxy processing unit F35 accepts the proxy communication when a state of communication using the cellular line or Wi-Fi available for the subject device satisfies a predetermined proxy acceptance condition. As the proxy acceptance condition, a condition for the downlink communication and a condition for the uplink communication may be set separately.

When the second communication device 1B determines to accept the proxy communication request based on the state of the cellular line or the like available for the subject device, the second communication device 1B returns an acceptance response to the first communication device 1A via the vehicle-to-vehicle communication (step S43). The acceptance response is a response signal declaring that the proxy communication is accepted. The acceptance response can be regarded as a kind of ACK. The acceptance response may include information for the request source communication device to specify the proxy communication device, such as a MAC address or an IP address of the subject device. The second communication device 1B may notify the first communication device 1A of an IP address of the subject device as a transfer destination IP address.

When the state of the communication using the cellular line or Wi-Fi available for the subject device does not satisfy the proxy acceptance condition, the second communication device 1B may return a rejection response which is a response signal indicating rejection of the proxy communication. The rejection response can be regarded as a kind of NACK. The in-vehicle communication device 1, which has been requested to perform proxy communication, determines whether to accept the request based on the state of the communication line available for the subject device, and returns the determination result.

In response to receiving the acceptance response to the proxy communication request, the first communication device 1A newly prepares a source port for proxy communication (step S44). The source port number prepared here is different from a source port used when the first communication device 1A performs data communication with the application server 4 using a cellular line or Wi-Fi. For convenience, the source port prepared for the proxy communication is also referred to as a proxy communication source port. The first communication device 1A notifies the second communication device 1B of a source port number for proxy communication and final destination information via vehicle-to-vehicle communication (step S45). The final destination information indicates an IP address of the application server 4 with which the target application wants to perform communication.

The destination information may include a MAC address of the application server 4 as a final destination. The source port for proxy communication may be a port that is not used by the second communication device 1B. Further, the source port number for proxy communication may be a port that is not used by both the first communication device 1A and the second communication device 1B. According to such a port setting mode, it is possible to distinguish between the traffic by proxy communication and the traffic by non-proxy communication regardless of the traffic of which layer is measured.

Upon acquiring the source port number for proxy communication and the destination information from the first communication device 1A, the second communication device 1B requests the relay server 5 to secure a source port specified by the first communication device 1A for the proxy communication (step S46). The second communication device 1B notifies the relay server 5 that the port number is a port for communication between the first communication device 1A and the application server 4. At this time, the application ID of the target application, a communication device ID of the first communication device 1A, an ECU-ID accommodating the target application, and the like may be notified to the relay server 5. The ID and the like of the target application can be acquired by the first communication device 1A. For example, the ID or the like of the target application may be included in the proxy communication request, or may be transmitted from the first communication device 1A to the second communication device 1B as a further response to the acceptance response.

The second communication device 1B performs a routing process based on the destination IP address notified by the first communication device 1A, and establishes a communication path to the specified application server 4 (step S47). When the communication path is prepared, the second communication device 1B transmits a path establishment report to the first communication device 1A (step S48). The path establishment report corresponds to a radio signal for notifying that the proxy communication is possible.

Upon receiving the path establishment report from the second communication device 1B, the first communication device 1A transmits a permission response to the ACP client 82 corresponding to the target application (S15 in FIG. 6). Upon receiving the communication permission response from the first communication device 1A, the ACP client 82 performs the request management process (step S16) and notifies the application 81 of the source port number or the presence or absence of the token (step S17).

Upon receiving the report indicating that the communication path has been secured from the ACP client 82, the application 81 generates a communication packet that includes encrypted data and specifies the transmission source as the subject device and a desired application server 4 as the destination in an L3 header, and outputs the communication packet to the first communication device 1A. Here, L3 indicates a layer 3 (network layer) in an OSI reference model. The L3 header indicates, for example, the IP header. That is, the application 81 outputs, to the first communication device 1A, an IP packet in which the IP address of the application server 4 as the destination and the source port number for proxy communication are inserted into a data field as the IP header.

The first communication device 1A generates, as data to be transferred, a communication frame in which an L2 header (so-called MAC header) in which a MAC address of the second communication device 1B is set as a destination MAC address is added to the IP packet input from the application 81. The communication frame is transmitted to the second communication device 1B via vehicle-to-vehicle communication. Here, L2 refers to a layer 2 (data link layer) in the OSI reference model.

Upon receiving the data from the first communication device 1A, the second communication device 1B performs a transfer process by rewriting the L2 header (MAC header) based on the routing table prepared in advance in the routing process. As one aspect, the second communication device 1B does not rewrite the L3 header (IP header) of data provided from the request source communication device during the proxy communication. That is, the second communication device 1B as the proxy communication device performs transfer without rewriting the IP address or the port number.

According to the above configuration, the communication packet transmitted by the first communication device 1A is relayed by the second communication device 1B, the network-side device, and the relay server 5 and reaches the application server 4. That is, at the time of using the proxy communication, the data from the first communication device 1A does not directly enter the network-side device but passes through the second communication device 1B. Although an operation at the time of the uplink communication is mainly described above, the downlink communication may also be performed on the same communication path. The source port refers to a port of the in-vehicle communication device 1, and a source port in the downlink communication may be replaced with a destination port.

With respect to the communication using the port for proxy communication, the relay server 5 counts traffic in the proxy communication separately from a normal traffic. For example, as illustrated in FIG. 8, an amount of data of the communication performed by the proxy communication is managed separately from an amount of data of the normal communication using the port number. The normal communication refers to communication that is not taken over, that is, communication that is performed by the in-vehicle communication device 1 to which the application 81 belongs using the cellular line or Wi-Fi available for the subject device. The normal communication for the proxy communication device refers to communication for the in-vehicle communication device 1 itself (that is, own device).

The TCU-ID illustrated in FIG. 8 means a communication device ID, and as an example, "101" indicates the communication device ID of the first communication device 1A, and "102" indicates a communication device ID of the second communication device 1B. Traffic of a row in which the port number is set to 49152 represents traffic in the normal communication, and traffic of a row in which the port number is set to 49154 represents traffic taken over by the second communication device 1B. A proxy device ID indicates an ID of the in-vehicle communication device 1 that performed the proxy communication. The example illustrated in FIG. 8 shows a case where the second communication device 1B takes over data communication of 1.2 GB for the first communication device 1A. The traffic and the port number may be classified and managed according to the type of communication line or the communication carrier that provides the line.

In a configuration in which the proxy communication device rewrites and transfers a transmission destination of the MAC header, the source IP address of the communication packet received by the relay server 5 in the uplink communication is an IP address of the first communication device 1A both when the communication packet arrives via the proxy communication and when the communication packet arrives via the normal communication. Therefore, the relay server 5 cannot identify whether the observed communication packet is the communication packet arrived via the proxy communication or the communication packet arrived via the normal communication from source IP address information. In contrast, according to a configuration of the present disclosure, the relay server 5 can distinguish between the communication packet arrived via the proxy communication and the communication packet arrived via the normal communication by making ports used for communication different between the proxy communication and the normal communication.

<Effects>

According to the above configuration, the ports used for communication are different between the proxy communication and the normal communication. By counting the traffic separately for each port number, it is possible to separately manage traffic that has been taken over and traffic that has not been taken over. As a result, for example, it is possible to appropriately perform billing according to the traffic.

For example, as disclosed in US2018/0227723A1, in a configuration in which traffic for each UE is managed based on bearer information assigned to each UE, an amount of proxy communication for the first communication device 1A can be counted as the traffic of the second communication device 1B. Specifically, in the example illustrated in FIG. 8, the traffic of 1.2 GB can be counted as the traffic of the second communication device 1B. A configuration in which the traffic for each UE is managed based on an assignment amount of a radio bearer for each UE corresponds to a configuration in which an actual traffic of the second communication device 1B is specified using control information of a control-plane. The actual traffic is traffic corresponding to an amount obtained by actually using resources such as a radio bearer, and includes an amount of proxy communication.

In response to such a concern, according to the above configuration, since the traffic of the proxy communication can be distinguished from the normal traffic, it is possible to prevent the amount of the proxy communication for the first communication device 1A from being counted as the traffic of the second communication device 1B. It is possible to exclude, from the actual traffic of the second communication device 1B, the amount of the proxy communication for the first communication device 1A.

While the embodiment of the present disclosure has been described above, the present disclosure is not limited to the embodiment described above, and various modifications to be described below are included in a technical scope of the present disclosure, and can be implemented by various changes within a scope not departing from the spirit described below. For example, the following various supplements and modifications can be implemented in combination as appropriate as long as technical contradiction does not occur. Members having the same functions as those described above are denoted by the same reference numerals, and descriptions of the same members will be omitted. When only a part of the configuration is referred to, the above description can be applied to other parts.

Although an embodiment in which the second communication device 1B as the proxy communication device realizes proxy communication by rewriting and transferring the transmission destination of the MAC header without rewriting the contents of the IP header has been disclosed above, the present disclosure is not limited thereto. For example, the second communication device 1B as the proxy communication device may be configured to rewrite the source IP address to the IP address of the subject device and transfer the address after establishing a communication path from the subject device to the desired application server 4. In this case, based on the receipt of the proxy communication request, the second communication device 1B sets a source port for proxy communication from the unused source ports, and notifies the relay server of the source port for proxy communication. In the proxy communication, data communication between the first communication device 1A and the application server 4 may be relayed using the port for proxy communication.

In the above modification, the relay server 5 can also identify, from the port number used for the data communication, whether the data communication is based on the proxy communication or the normal communication. FIG. 9 illustrates an example of a management result of traffic when an IP address is rewritten. In a configuration in which traffic for each in-vehicle communication device 1 is managed temporarily based on the transmission source/destination IP address, although the amount of the proxy communication is once counted as the traffic of the second communication device 1B, the amount of the proxy communication can be excluded using the source port number. A request source ID illustrated in FIG. 9 means a communication device ID of a request source communication device. The source port number "49158" is a source port number prepared for the proxy communication, and traffic associated with the number indicates the amount of the proxy communication for the first communication device 1A.

In a configuration in which the traffic for each piece of user equipment is managed by observing the amount of packets in the PDCP layer described above, as illustrated in FIG. 9, the traffic of the proxy communication may be counted as the traffic of the second communication device as the proxy communication device. According to the configuration of the present disclosure, as described above, since the traffic of the proxy communication can be managed separately from an amount of data of the non-proxy communication, even when the traffic is counted in any layer, it is possible to finally specify the substantial traffic in each in-vehicle communication device 1.

Here, whether the proxy communication is available for each application 81, in other words, for each type of data communication may be set in advance. For example, an application having a strong entertainment property such as operation viewing, music reproduction, or web browsing, an application having a high private property, or an application having a low urgency may be set not to be able to use the proxy communication. On the other hand, data related to a vehicle model or highly public data may be set to be able to use the proxy communication. The data related to the vehicle model indicates information on the installed ECU, information on the in-vehicle communication device 1, and the like. The information on the ECU/in-vehicle communication device 1 indicates a part or all of a model number, an ID, a grade, a release year (generation), and the like. In other words, the highly public data is data that is beneficial to a third party, and for example, is assumed to be probe data. A concept of the probe data may include a traveling locus, traffic information, road surface information, and the like. The probe data may be observation data for dynamic map elements such as an accident vehicle, a parked vehicle, a fallen object, a traffic regulation, and a congested section. The probe data may be data indicating behaviors of the vehicle, such as an operating speed of a windshield wiper for each point, information on a point where a lane is changed, and information on a point where a sudden braking is performed. The probe data can be widely understood as data for creating a static map or a dynamic map.

According to a configuration in which the possibility of the proxy communication is set for each type of application/data as described above, it is possible to reduce the possibility that a wireless resource for the vehicle-to-vehicle communication becomes tight or a processing load in each in-vehicle communication device 1 increases by performing the proxy communication for the communication having a low urgency. The application/data communication that can use the proxy communication and the application/data communication that prohibits the use of the proxy communication may be set in advance, or may be changeable in settings based on an external instruction from the relay server 5 or a user operation.

Although an embodiment in which the relay server 5 is a server that relays communication and manages the traffic has been disclosed above, the present disclosure is not limited thereto. The relay server 5 itself may also be configured as a type of the application server 4 that performs a process corresponding to a predetermined application 81. A function of the relay server 5 may be representatively provided in any one application server 4, or may be provided in each application server 4.

APPENDIX (1)

The present disclosure also includes the following configuration/method.
[Configuration (1)]
A vehicle communication system including:
multiple communication devices used in different vehicles and configured to perform cellular communication and vehicle-to-vehicle communication; and a relay server configured to relay data communication between the communication devices and any application server and manage data traffic for each communication device, in which
  each of the multiple communication devices is configured to perform the path setting for the proxy communication in cooperation with the relay server when a request for the proxy communication is received from another device, which is another communication device, and the relay server is configured to manage traffic for the communication device itself and traffic for the proxy communication separately based on path setting information.

[Method (1)]

Traffic management method implemented in cooperation with multiple communication devices (1) used in different vehicles and configured to perform cellular communication and vehicle-to-vehicle communication, and a relay server (5) configured to relay data communication between the communication devices and an application server and manage data traffic for each communication device, the method including:
  relaying, by the communication device, data communication between the application server and another device, which is another communication device, as proxy communication based on a request from the other communication device;
  performing, by the communication device, the cellular communication using, as a port for the proxy communication, a port that is not used at the time of normal communication that is not the proxy communication by the other device or the own device as a request source of the proxy communication, when the proxy communication is performed;
  notifying, by the communication device, the relay server of a number of a port for the proxy communication; and
  managing, by the relay server, an amount of data for the proxy communication separately from an amount of data communication that is not the proxy communication based on a number of a port used for communication.

APPENDIX (2)

The device, the system, and the method described in the present disclosure may be implemented by a dedicated computer constituting a processor that is programmed to execute one or more functions implemented by a computer program. The device and the method described in the present disclosure may be implemented using a dedicated hardware logic circuit. Further, the device and the method described in the present disclosure may be implemented by one or more dedicated computers implemented by a combination of a processor that executes a computer program and one or more hardware logic circuits. The computer program may be stored in a computer-readable non-transitory tangible recording medium as an instruction to be executed by the computer. For example, means and/or functions provided by the in-vehicle communication device 1 and the like can be provided by software recorded in a substantial memory device, a computer executing the software, only software, only hardware, or a combination thereof. The in-vehicle communication device 1 may be implemented using any one of a CPU, an MPU, a GPU, and a data flow processor (DFP) or a combination thereof.

A part of the functions of the in-vehicle communication device 1 may be implemented by using a system-on chip (SoC), a field-programmable gate array (FPGA), an application specific integrated circuit (ASIC), or the like. Various programs may be stored in a non-transitory tangible storage medium. As a storage medium of the program, various storage mediums such as a hard-disk drive (HDD), a solid state drive (SSD), a flash memory, and a secure digital (SD) card can be adopted. The same applies to the configuration of the relay server 5. A communication control method performed by each device constituting the vehicle communication system 100, a program for causing a computer to function as the in-vehicle communication device 1, a non-transitory tangible recording medium such as a semiconductor memory in which the program is recorded, and the like are also included in the scope of the present disclosure. A program for causing the computer to function as the relay server 5, and a non-transitory tangible recording medium such as a semiconductor memory in which the program is recorded are also included in the scope of the present disclosure.

What is claimed is:

1. A vehicle communication system comprising:
  a plurality of communication devices to be used in different vehicles and configured to perform cellular communication, which is wireless communication via a cellular base station, and vehicle-to-vehicle communication; and
  a relay server configured to
    relay data communication between the communication devices and an application server and
    manage data traffic for each of the communication devices, wherein
  each of the plurality of communication devices includes a proxy processing unit configured to relay, as proxy communication, data communication between the application server and an other device, which is an other of the communication devices, based on a request from the other communication device,
  the other device or a own device, which is a request source of the proxy communication, is configured to, when performing the proxy communication,
    perform the cellular communication using, as a port for the proxy communication, a port that is not used in normal communication, which is not the proxy communication, and
    notify the relay server of a number of the port for the proxy communication, and
  the relay server is configured to manage an amount of data for the proxy communication separately from an amount of data for data communication, which is not the proxy communication, based on a number of a port used for communication.

2. The vehicle communication system according to claim 1, wherein
  the proxy processing unit is configured to,
  when performing the proxy communication based on the request from the other device,
    receive data to be transferred from the other device via the vehicle-to-vehicle communication, and
    transmit the data, which is received from the other device via the vehicle-to-vehicle communication, to the application server via the cellular communication using the port for the proxy communication.

3. The vehicle communication system according to claim 1, wherein
  the proxy processing unit is configured to,
  when performing the proxy communication based on the request from the other device, receive data to be transferred from the application server via the cellular communication using the port for the proxy communication, and transfer the data, which is received from the application server via the cellular communication, to the other device, which is the request source, via the vehicle-to-vehicle communication.

4. The vehicle communication system according to claim 1, wherein
the proxy processing unit is configured to use, as the port for the proxy communication, an unused port of the request source.

5. The vehicle communication system according to claim 1, wherein
data exchanged via the vehicle-to-vehicle communication includes
a MAC header, which is a data field indicating a MAC address of a transmission source and a MAC address of a destination, and
an IP header, which is a data field indicating an IP address of the transmission source and an IP address of the destination, and
the proxy processing unit is configured to perform, as the proxy communication, a transfer process by rewriting the MAC header without rewriting the IP header.

6. The vehicle communication system according to claim 1, wherein
the plurality of communication devices are configured to share, via the vehicle-to-vehicle communication, a communication state of a cellular line, which is available for the own device, and
the proxy processing unit is configured to determine whether to request the proxy communication to the other device by comparing the communication state of the cellular line, which is available for the own device, with a communication state of a cellular line, which is available for the other device.

7. The vehicle communication system according to claim 6, wherein
the communication state includes a communication speed, and
the proxy processing unit is configured to request the proxy communication to the other device, when the communication speed of the cellular line, which is available for the other device, is higher than the communication speed of the cellular line, which is available for the own device, by a predetermined value or more.

8. The vehicle communication system according to claim 1, wherein
the proxy processing unit is configured to
determine whether to accept the proxy communication based on a communication state of a cellular line, which is available for the own device, when receiving the request for the proxy communication from the other device, and
wirelessly transmit a determination result to the request source.

9. The vehicle communication system according to claim 8, wherein
the request source is configured to notify a request destination of an amount of data to be transmitted via the proxy communication, and
the proxy processing unit is configured to
determine whether the amount of data, which is notified by the request source, can be transmitted within a predetermined time, based on the communication state of the cellular line, which is available for the own device, and
transmit, to the request source, a response that is not to accept the proxy communication, on determination that the amount of data, which is notified by the request source, cannot be transmitted within the predetermined time.

10. A relay server configured to relay data communication between communication devices, which are to be used in vehicles and configured to perform wireless communication via a cellular base station and vehicle-to-vehicle communication, and an application server and manage data traffic for each of the communication devices, the relay server configured to
acquire a number of a port for proxy communication from the communication device when the communication device takes over data communication between the application server and an other device, which is an other of the communication devices, and
manage an amount of data for the proxy communication separately from an amount of data for data communication, which is not the proxy communication, based on the number of the port used for the data communication.

11. A vehicle communication device configured to perform cellular communication, which is wireless communication via a cellular base station, and vehicle-to-vehicle communication, the vehicle communication device further configured to perform communication with an external device via a predetermined relay server, the predetermined relay server configured to manage traffic of the vehicle communication device, the vehicle communication device comprising:
a proxy processing unit configured to relay data communication between the external device and an other vehicle communication device, by using, as proxy communication, the vehicle-to-vehicle communication and the cellular communication in combination, based on a request from the other vehicle communication device, wherein
the proxy processing unit is configured to
perform communication with the external device using a port for the proxy communication when performing the proxy communication, wherein the port for the proxy communication is not used in normal communication, which is not the proxy communication, by the other vehicle communication device or an own device, which is a request source of the proxy communication, and
notify the relay server of a number of the port for the proxy communication.

\* \* \* \* \*